United States Patent
Pincus et al.

(10) Patent No.: US 6,782,530 B1
(45) Date of Patent: Aug. 24, 2004

(54) METHOD OF RANKING MESSAGES GENERATED IN A COMPUTER SYSTEM

(75) Inventors: Jonathan D. Pincus, San Francisco, CA (US); William R. Softky, Menlo Park, CA (US); David Jon Sielaff, Oakland, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/286,500

(22) Filed: Apr. 5, 1999

(51) Int. Cl.$^7$ ................................................. G06F 9/44
(52) U.S. Cl. ...................................................... 717/124
(58) Field of Search .......................... 707/3, 10; 717/6, 717/5, 124; 709/224

(56) References Cited

U.S. PATENT DOCUMENTS

| | | | | | |
|---|---|---|---|---|---|
| 5,857,966 | A | * | 1/1999 | Clawson | 600/300 |
| 5,989,187 | A | * | 11/1999 | Clawson | 600/300 |
| 6,004,266 | A | * | 12/1999 | Clawson | 600/300 |
| 6,010,451 | A | * | 1/2000 | Clawson | 600/300 |
| 6,053,864 | A | * | 4/2000 | Clawson | 600/300 |
| 6,076,065 | A | * | 6/2000 | Clawson | 705/2 |
| 6,078,894 | A | * | 6/2000 | Clawson et al. | 705/11 |
| 6,106,459 | A | * | 8/2000 | Clawson | 600/300 |
| 6,327,364 | B1 | * | 12/2001 | Shaffer et al. | 379/265.02 |
| 6,356,936 | B1 | * | 3/2002 | Donoho et al. | 709/206 |

OTHER PUBLICATIONS

"Turbo Debugger User's Guide 2.5" Borland Corporation, pp. 339–347, 1991.*
Turbo Debugger 3.0 For Windows User's Guide, Borland, pp. 223–238,241–262,published1991.*
Beginnig Programming For Dummies, Chapter 14, debugging Your QBASIC Programs, pp. 195–203, 1999.*
Turbo C++ 3.0 For Windows, Borland, pp. 235–240, 262–263 , 1991.*
Phoenix Fire Department Computer Aided Dispatch and Mobile Termianl System RFP, Feb. 1, 1980, pp. 1–452.*
How Debuggers Work, J.B. Rosenberg, published 1996, pp. 95–133, 185–189, 235.*

* cited by examiner

*Primary Examiner*—Todd Ingberg
(74) *Attorney, Agent, or Firm*—Merchant & Gould

(57) ABSTRACT

According to one embodiment, a method of automatically assigning a ranking value to a plurality of received messages is disclosed. Each of the received messages provides information about a computer program. The method includes receiving a first message, storing the first message in the database and initializing the first message. Further, it is determined whether the first message is to be disqualified. If it is determined that the first message is to be disqualified, the first message is disqualified. If it is determined that the first message is not to be disqualified, a ranking value is automatically assigning to the first message based upon a predetermined set of criteria.

32 Claims, 7 Drawing Sheets

```
Msg 1:
WARNING _ TYPE =      memo   leak
LINES_EXECUTED =      12
DESCRIPTION =         tempMem[x + y[ 2+z[ii]] ]
RANK =                0.0
RANK BIN =            0
WHY_DISQUALIFIED =    (nothing)

Msg 2:
WARNING _ TYPE =      invalid_pointer
LINES_EXECUTED =      3
DESCRIPTION =         windowPtr->reSize0
RANK =                0.0
RANK BIN =            0
WHY_DISQUALIFIED      (nothing)

Msg 3:
WARNING _ TYPE =      using_uninitialized_memory
LINES_EXECUTED =      4
DESCRIPTION =         newValue
RANK =                0.0
RANK BIN =            0
WHY_DISQUALIFIED      (nothing)

Msg 4:
WARNING _ TYPE =      using_uninitialized_memory
LINES_EXECUTED =      9
DESCRIPTION =         oldValue
RANK =                0.0
RANK BIN =            0
WHY_DISQUALIFIED      (nothing)

Message:  Msg 1    Msg 2    Msg 3    Msg 4
Rank:     0.0      0.0      0.0      0.0
```

Msg 1:
WARNING _ TYPE =        memo    leak
LINES_EXECUTED =        12
DESCRIPTION =           tempMem[x + y[ 2+z[ii]] ]
RANK =                  0.0
RANK BIN =              0
WHY_DISQUALIFIED =      (nothing)

Msg 2:
WARNING _ TYPE =        invalid_pointer
LINES_EXECUTED =        3
DESCRIPTION =           windowPtr->reSize0
RANK =                  0.0
RANK BIN =              0
WHY_DISQUALIFIED        (nothing)

Msg 3:
WARNING _ TYPE =        using_uninitialized_memory
LINES_EXECUTED =        4
DESCRIPTION =           newValue
RANK =                  0.0
RANK BIN =              0
WHY_DISQUALIFIED        (nothing)

Msg 4:
WARNING _ TYPE =        using_uninitialized_memory
LINES_EXECUTED =        9
DESCRIPTION =           oldValue
RANK =                  0.0
RANK BIN =              0
WHY_DISQUALIFIED        (nothing)

| *Message*: | Msg 1 | Msg 2 | Msg 3 | Msg 4 |
|---|---|---|---|---|
| Rank: | 0.0 | 0.0 | 0.0 | 0.0 |

*Fig. 4A*

| Message: | Msg 1 | Msg 2 | Msg 3 | Msg 4 |
|---|---|---|---|---|
| Rank: | 100.0 | 100.0 | 100.0 | 100.0 |

Initialize

| Message: | Msg 1 | Msg 2 | Msg 3 | Msg 4 |
|---|---|---|---|---|
| Rank: | 400.0 | 100.0 | 100.0 | 100.0 |

Diqualification

| Message: | Msg 1 | Msg 2 | Msg 3 | Msg 4 |
|---|---|---|---|---|
| Rank: | 400.0 | 80.0 | 140.0 | 190.0 |

Rank

| Message: | Msg 1 | Msg 2 | Msg 3 | Msg 4 |
|---|---|---|---|---|
| Rank: | 400.0 | 80.0 | 140.0 | 190.0 |
| Rank-bin: | 3 | 1 | 2 | 2 |

Sort

*Fig. 4B*

METHOD OF RANKING MESSAGES GENERATED IN A COMPUTER SYSTEM

FIELD OF THE INVENTION

This invention relates to the analysis of computer programs, and in particular, the reporting of messages generated by the analysis of computer programs.

BACKGROUND

Computer programs are typically complicated structures. Various structural and behavioral aspects of computer programs are of interest to those who design and fix them. For example, a computer engineer (or programmer) may, in a large-scale software project, desire a list of subroutines that allocate memory or are likely to call other specific functions. Further, a programmer may want to establish a list of messages regarding circumstances under which resources (e.g., memory, disk space, and modem connections) are needed, allocated or removed. In addition, a programmer may desire a list of messages regarding possible paths in which the program may or may not execute, as well as possible paths along which the program might fail or produce defective results.

One method of generating the messages described above is to manually produce them. However, this method is often times impractical since it may be very tedious and time consuming. Instead, various automated methods for producing list of messages have been developed. Applications in which messages are automatically generated include, for example, various computer program compilers (e.g., Native DEC and GNU C++ compilers) and software component simulation technology (e.g., PREfix/Enterprise developed by Intrinsa Corporation of Mountain View, Calif.). The automated methods for producing lists of messages, however, offer no effective method of distinguishing between messages that relate to issues that are of more importance to a programmer, without having to examine a vast majority of the generated messages. For instance, some of the generated messages may be of more importance, depending upon the content of the messages, the likelihood of the message being accurate, the ease with which the message can be understood, as well as other factors.

In typical message generation applications, messages are presented in the order in which the respective errors were found. Alternatively, messages may be presented in alphabetical order. Therefore, it is typically necessary to wade through many non-critical messages before finding a message generated in response to the detection of a critical one. As a result, a great deal of time (and expense) may be spent examining unimportant messages before actually finding a critical message.

Computer program compiler systems rank and report messages to a system user according to program information, warnings and errors. Compiler message rankings, however, are solely based on the severity of detected errors, which are in turn based upon warning types. In addition, compilers provide no explanation for why the ranking values are assigned to their respective messages. Moreover, compilers provide no method of sorting specific message types in which a programmer may be particularly interested. Therefore, a method of automatically assigning rankings to program messages in order to separate important messages from less significant messages before review is desired.

SUMMARY OF THE INVENTION

According to one embodiment, a method of automatically assigning a ranking value to a plurality of received messages is disclosed. Each of the received messages provides information about a computer program. The method includes receiving a first message, and automatically assigning a ranking value to the first message based upon a predetermined set of criteria.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

FIG. 4a illustrates one embodiment of information stored for messages received at a message ranking system;

FIG. 4b illustrates one embodiment of ranking stages at a message ranking system;

DETAILED DESCRIPTION

Figure 1:
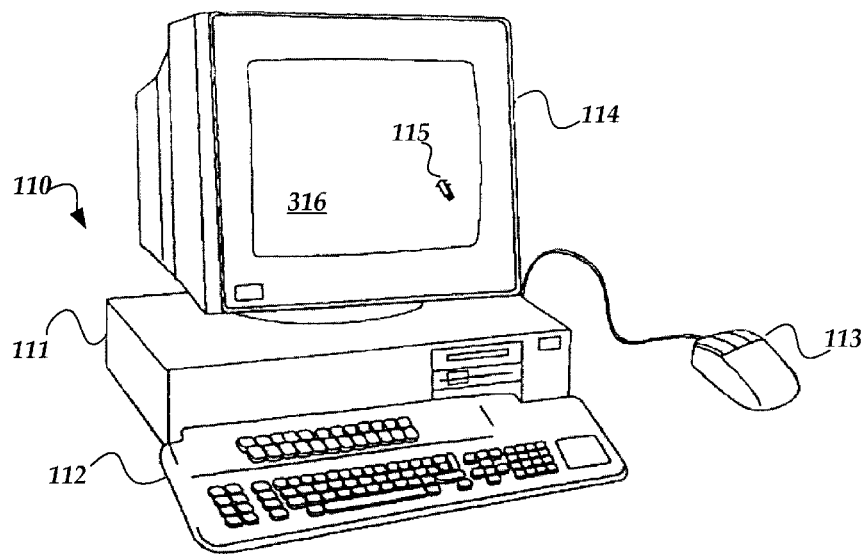
FIG. 1 is a diagram of one embodiment of a computer.

FIG. 1 is a diagram of one embodiment of a computer 110. Computer 110 includes a system unit 111, a keyboard 112, a mouse 113 and a graphics display device (or monitor) 114. Keyboard 112 and mouse 113 are user-input devices, and display device 114 is a user output device. Mouse 113 is used to control a cursor 115 displayed on the screen 116 of display device 114. The Graphic User Interface (GUI) supported by computer 110 allows the user to "point-and-shoot" by moving cursor 115 to a specific location on screen 116 and pressing a button on mouse 113 in order to perform a command or selection. According to one embodiment, the GUI may be implemented as a part of the operating system of computer 110. However, in other embodiments, the GUI may be a Web browser.

Figure 2:
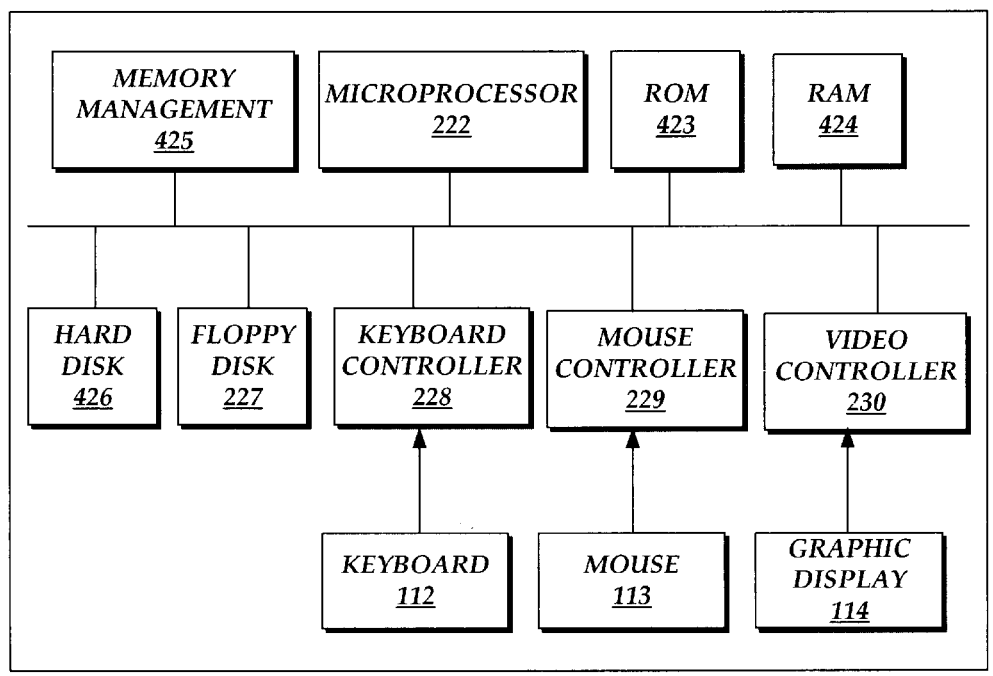
FIG. 2 is a block diagram of one embodiment of a system unit.

FIG. 2 is one embodiment of a block diagram of system unit 111. System unit 111 includes a system bus 221 to which the various components within system unit 111 are coupled. A microprocessor 222 is connected to the system bus 221 and is supported by Read Only Memory (ROM) 223 and Random Access Memory (RAM) 224, also connected to system bus 221. ROM 223 contains, among other code, the Basic Input/Output System (BIOS) code which controls basic hardware. RAM 224 is the main memory into which an operating system and application programs are loaded. A memory management chip 225 is connected to the system bus 221 and controls Direct Memory Access (DMA) operations, including paging data between RAM 224, a hard disk drive 226 and a floppy disk drive 227.

Further, system unit 111 includes a keyboard controller 228, a mouse controller 229 and a video controller 230, all coupled to system bus 221. As implied, keyboard controller 228 provides the hardware interface for keyboard 112, mouse controller 229 provides the hardware interface for mouse 113, and video controller 230 provides the hardware interface for graphic display device 114. One of ordinary skill in the art will appreciate that computer 110 may include other peripherals (e.g., optical storage media, audio I/O, printers, etc.). In addition, computer 110 may include a network interface module for communications with other computer systems.

According to one embodiment, computer system 110 may perform simulating execution of a computer program in order to detect programming errors in the computer program. In such an application, a component of a computer program (e.g., a procedure or function of the computer program) is analyzed to determine the effect of the component on resources used by the computer program. A component is analyzed by traversing the computer instructions (i.e., statements) of the component and tracking the state of the resources used by the component as affected by the statements of the component.

The simulation/error detection application is not described in further detail in order not to unnecessarily obscure the present invention. Nevertheless, the simulation and error detection application performed by computer system 110 operates according to a protocol described in U.S. Pat. No. 5,694,539 to Haley et. al. and in U.S. Pat. No. 5,790,778 to Bush et al., herein incorporated by reference.

Figure 3:
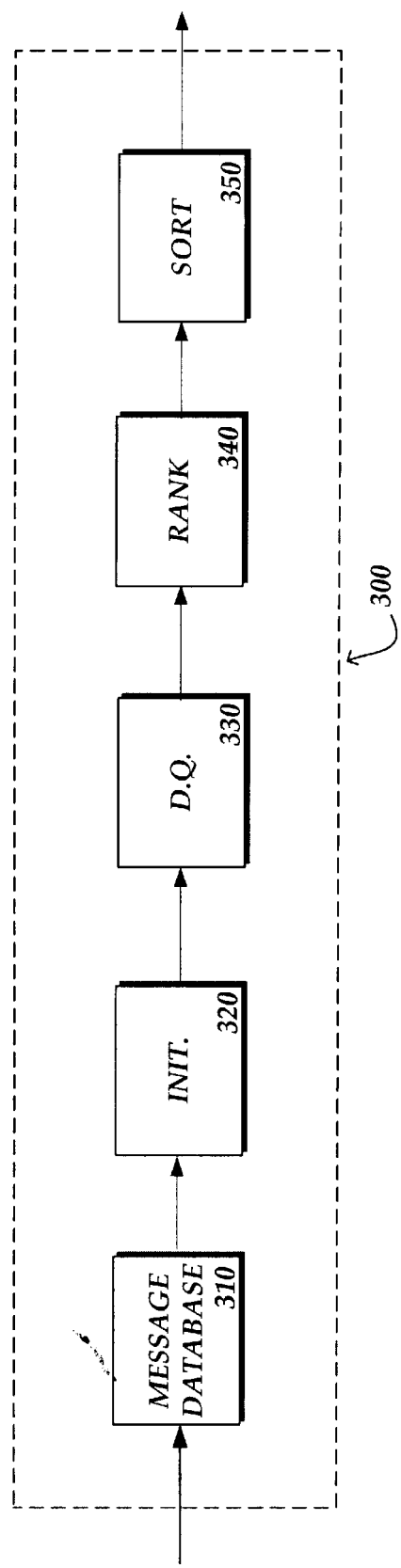
FIG. 3 illustrates one embodiment of a message ranking system.

After the simulation of a computer program, computer system 110 may also be configured to rank the resulting messages generated as a result of the simulation. FIG. 3 is a block diagram of one embodiment of a message ranking system 300 wherein computer system 110 ranks messages generated as a result of the simulation of a computer program. Messages produced by simulation are analyzed in order to sort messages based on predetermined criteria. A relevancy ranking is provided for each message using various information associated with the message.

The ranking system is carried out by scoring each message according to various factors. For example, each received message may be weighted according to severity, accuracy, complexity (i.e., difficulty for a user to comprehend), a user's ability to fix, etc. The weights of each message are accumulated to provide a final ranking. According to one embodiment, messages that are of greater importance are provided a lower numerical ranking than those of less importance. Alternatively, messages that are of greater importance may be provided with a higher numerical ranking than the less important messages.

According to one embodiment, ranking system 300 automatically ranks defect messages after completion of a simulation. In other embodiments, a system user may selectively initiate the ranking of defect messages at ranking system 300 after the simulation of a computer program. Referring to FIG. 3, ranking system 300 includes a message database 310, an initialization module 320, a disqualification (DQ) module 330, a ranking (rank) module 340 and a rank sort module 350. Database 310 stores defect messages generated upon the simulating execution of a computer program. Initialization module 320 initializes each defect message received in database 310 by assigning a nominal rank value. For instance, each message may be assigned a value of 100 after it has been received.

DQ module 330 analyzes each message in order to determine whether a particular message meets a minimum standard. If a message does meet the standard, the message is disqualified and is not presented to the user. Additionally, an explanatory message may be included indicating that a particular message has been disqualified. According to one embodiment, messages may be disqualified by assigning an elevated weight value to each message that meets the standard. However, one of ordinary skill in the art will appreciate that other methods may be used to disqualify messages. Examples of messages that may be disqualified are messages with a defect type that has a very low priority and messages whose consequences are not severe (i.e., informational messages). According to a further embodiment, DQ module 330 may be programmable to permit a user to select the type of messages that are to be disqualified.

Rank module 340 further analyzes the messages that were not disqualified in order to provide numerical scoring for each message based upon the various factors. According to one embodiment, each message is assigned a bonus weight for each important factor that is included, and a penalty weight for each factor indicating the undesirability of the message. In this embodiment, the bonuses are subtracted from the overall ranking, while the penalties are added. The bonuses and penalties are subsequently accumulated to provide a final ranking.

Bonuses may be given, for example, to messages that include an especially severe defect (e.g., an invalid pointer), that involve only a few lines of statements, or that occur completely within one function. Penalties may be given for messages that are difficult to understand, messages that involve inferences, messages that involve references to multiple functions, etc. In the case where a message includes references to multiple functions, a penalty may be added for each reference to a different function. Further, a penalty may be added for each program line that was involved in the message. In addition, other bonuses and penalties may be added for other message properties that reflect the mechanism by which the message was generated. For instance, the bonuses and penalties may additionally depend on details (such as protocols, approximations, internal models, etc.) that are used and stored by the software simulation process that produced the message. According to one embodiment, rank module 340 may be programmable in order to provide a user with the ability to specify the relative weights to be given to each of the various factors.

Rank sort module 350 performs a sort for the non-disqualified messages based upon ranking. As described above, messages with the lowest rankings are presented at the top of the list, while the lowest scores are presented at the bottom. Consequently, a user is permitted to identify the most useful messages. According to one embodiment, each message may be assigned to one of a predetermined number of message bins after sorting at rank sort module 350. The messages are assigned to a bin based upon the rankings. In such an embodiment, a user may display the messages with a particular level of importance by selecting a specific bin.

FIG. 4a illustrates one embodiment of information stored in database 310 for each message received at message ranking system 300. Messages 1–4 are received at database 310 after program simulation. Each message may include information fields, such as: WARNING_TYPE; LINES_EXECUTED; DESCRIPTION; RANK; RANK_BIN; and WHY_DISQUALIFIED. The WARNING_TYPE field indicates the type of defect that occurred while simulating a particular instruction. The LINES_EXECUTED field reveals the number of program lines involved with the particular defect, while the DESCRIPTION field specifies which instruction or function caused the defect. The RANK field shows the current rank of the defect message after being analyzed at rank module 340, and the RANK_BIN field designates which bin the message has been placed. The WHY_DISQUALIFIED, if applicable, indicates the reason a message has been disqualified at DQ module 330.

Before any of the modules of message ranking system 300 have been executed, the RANK field for all of the messages shows a zero. FIG. 4b illustrates one embodiment of ranking stages at message ranking system 300. As discussed above, all defect messages received at database 310 are initialized to a nominal value. In this particular embodiment, messages 1–4 are initially set to a value of 100. Subsequently, each message is analyzed by DQ module 430.

According to one embodiment, a message may be disqualified if it contains so many nested levels of indexing that it is effectively unintelligible. Consequently, a command may be executed at DQ module 330 that analyzes the execution field of each message in order to determine if there is a message that contains excessive nesting. Any messages that meet the criteria of the command are disqualified by setting their RANK fields to a very high number (e.g., 400). Referring to FIG. 4a, the DESCRIPTION field of message 1 includes "tempMem[x+y[2+z[ii]]]" which includes nested levels of indexing. Therefore, message 1 is disqualified by setting it to a value of 400 as shown in FIG. 4b. The WHY_DISQUALIFIED field is updated to indicate that message 1 was disqualified due to too much nesting.

The remaining non-disqualified messages are analyzed at rank module 340 to determine whether they meet various criteria. For example, a bonus value of —50 may be added to the RANK field of a message if the WARNING_TYPE field indicates that the defect was caused by an invalid pointer. This low bonus value is assigned to invalid pointers because they are especially severe program defects that are capable of causing immediate program failure. Also, a complexity penalty value of 10 may be added for each program line involved in the defect. Given that message 2 includes an invalid pointer defect, a bonus of —50 is added. However, since the LINES_EXECUTED FIELD includes a 3, a penalty of 30 is added. Accordingly, the RANK field for message 2 is set at 80. Penalties of 40 and 90 are added to messages 3 and 4, respectively due to the contents of the LINES_EXECUTED FIELD for each. Consequently, the rank of message 3 is 140 and the rank of message 4 is 190.

Finally, the messages are sorted and grouped into categories at sort module 350. According to one embodiment, the messages may be grouped into three categories (or bins). For messages that have a rank greater than 0 and less than 100, the RANK_BIN field is set to 1. In addition, for messages that have a rank greater than 100 and less than 200, the RANK_BIN field is set to 2. Further, for messages the have a rank greater than 200, the RANK_BIN field is set to 3. Therefore, message 1 is placed into bin 3, message 2 is placed into bin 1, and messages 3 and 4 are placed into bin 2. Once the RANK and RANK_BIN values have been set, a user may display the messages in ascending order by rank. Alternatively, the user may display only the messages in a particular bin. Consequently, the user is able to focus on the most severe and intelligible messages first.

One of ordinary skill in the art will appreciate that all of the modules described above are not necessary to implement ranking system 300. For example, it is not necessary to disqualify any of the defect messages prior to ranking process executed at rank module 340, nor is it necessary to initialize all of the messages to a preset value as is executed at initiation module 320.

Figure 5A:
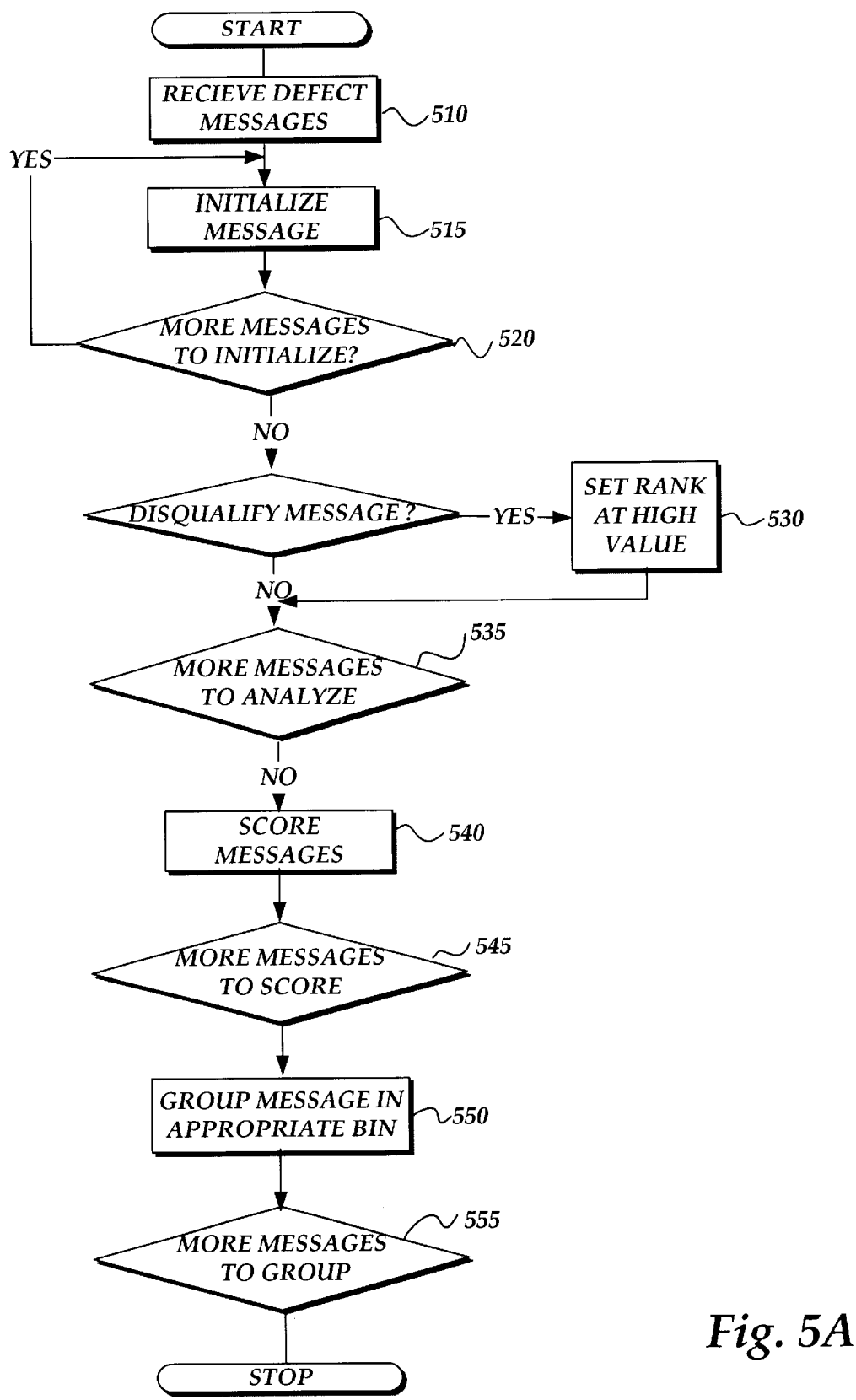
FIG. 5 is a flow diagram for one embodiment of the operation of a message ranking system.
Figure 5B:
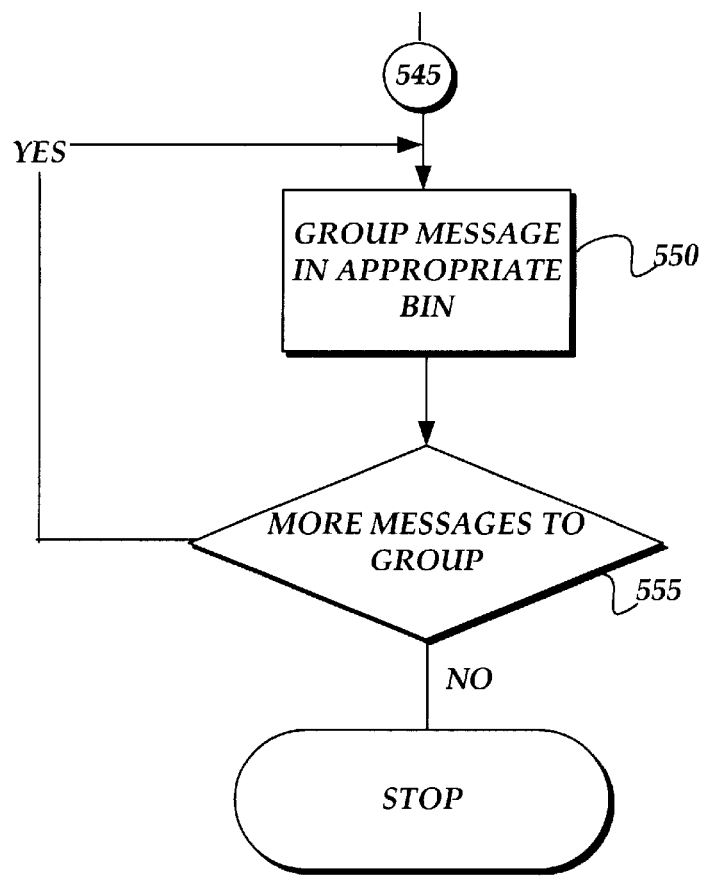

FIG. 5 is a flow diagram for one embodiment of the operation of message ranking system 300. At process block 510 messages are received at database 310 after a program simulation. At process block 515, the RANK field of the first defect message is set to an initial value. At process block 520, it is determined whether there are messages remaining that must be initialized. If there are further messages to be initialized, control is returned to process block 515 where the rank of a subsequent defect message is initialized. If there are no further messages to be initialized, the initialization process has been completed At process block 525, the first message is analyzed in order to determine whether it should be disqualified. If it is determined that the message should be disqualified, the RANK field of the message is set to a high value in process block 530. After setting the RANK field of the message to a high value, or if it is determined that the message should not be disqualified, it is determined in process block 535 whether there are messages remaining that must be examined for disqualification. If there are further messages to be initialized, control is returned to process block 525 where a subsequent defect message is analyzed to determine whether it should be disqualified. If there are no further messages to analyze, the disqualification process has been completed.

At process block 540, the first defect message is scored with a bonus/penalty system similar to that described above. Consequently, the RANK field of the message is set to its final rank. At process block 545, it is determined whether there are messages remaining that must be scored. If there are further messages to be scored, control is returned to process block 540 where a subsequent defect message is scored. If there are no further messages to be scored, the ranking process has been completed.

At process block 550, the first defect message is placed into the proper bin corresponding to its final rank value. At process block 555, it is determined whether there are messages remaining to be placed in a bin. If there are further messages to be placed, control is returned to process block 550 where a subsequent message is placed in the proper bin. If there are no further messages, message ranking system 300 has completed the ranking operation.

Figure 6:
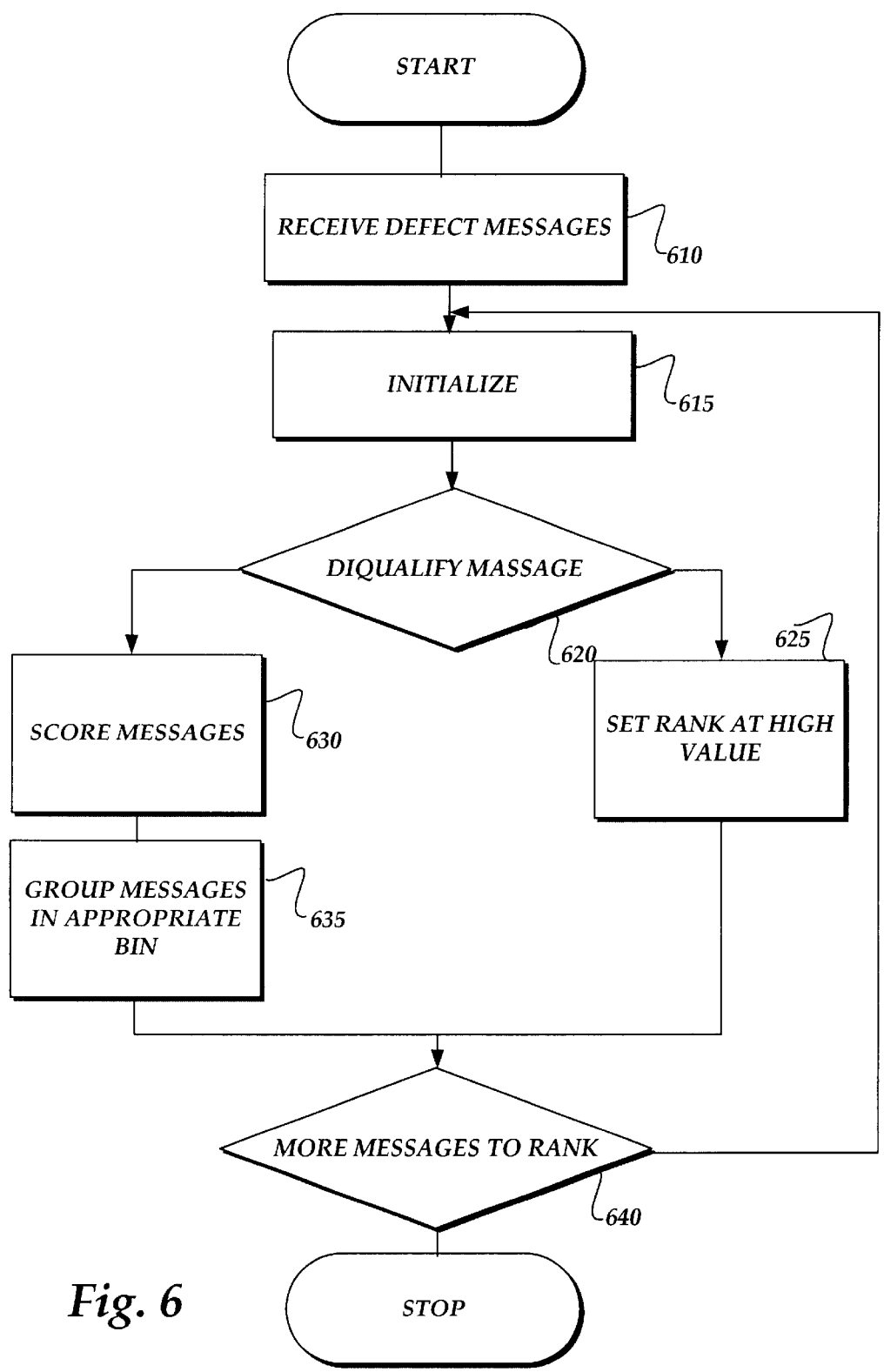
FIG. 6 is a flow diagram for one embodiment of the operation of a message ranking system.

FIG. 6 is a flow diagram for another embodiment of the operation of message ranking system 300 wherein each message is processed all at once. At process block 610 defect messages are received at database 310 after a program simulation. At process block 615, the RANK field of a message is set to an initial value. At process block 620, the same message is analyzed in order to determine whether it should be disqualified.

If it is determined that the message should not be disqualified, the defect message is scored with a bonus/penalty system in process block 630. Consequently, the RANK field of the message is set to its final rank. At process block 635, the defect message is grouped into the proper bin corresponding to its final rank value. At process block 640, it is determined whether there are messages remaining to be processed by message ranking system 300. If there are further messages to be processed, control is returned to process block 615 where a subsequent message is initialized. If there are no further messages, message ranking system 300 has completed the ranking operation.

If it is determined that the message should be disqualified, the RANK field of the message is set to a high value, process block 625. Subsequently, it is determined whether there are messages remaining to be processed by message ranking system 300, process block 640. If there are further messages to be processed, control is returned to process block 615 where a subsequent defect message is initialized. If there are no further messages, the ranking operation has been completed.

Thus, a method of automatically assigning rankings to program messages in order to separate important messages from less significant messages before review has been described.

What is claimed is:

1. A method of reporting defect messages, comprising:
   receiving a plurality of defect messages providing information about a computer program;
   automatically ranking the defect messages according to a set of criteria including whether a defect message includes an invalid pointer, the number of program lines involved to generate the defect message, whether a defect message involves an inference and whether a defect message refers to multiple functions.

2. The method of claim 1, further comprising storing a first message of the plurality of defect messages in a database after the first message has been received.

3. The method of claim 2, further comprising initializing the first message after it has been stored in the database.

4. The method of claim 3, wherein the process of initializing comprises assigning an initial value to the first message.

5. The method of claim 1, wherein the set of criteria is programmable.

6. A method of reporting defect messages detected during a simulating execution of a computer program, the method comprising:
   receiving a plurality of defect messages; and
   automatically ranking the defect messages according to a set of criteria comprising severity, severity including defect messages having invalid pointers, and complexity, wherein complexity is based on the number of program lines included in each defect message.

7. The method of claim 6, further comprising:
   determining whether the first message is to be disqualified after the first message has been received; and
   if so, disqualifying the first message;
   otherwise, automatically ranking the first message by assigning a first rank value.

8. The method of claim 7, wherein the first message is disqualified by assigning a second rank value in automatically ranking the first message, wherein the second rank value is high relative to the first rank value.

9. The method of claim 8, further comprising:
   determining whether a second message of the plurality of defect messages is to be disqualified; and
   if not, automatically ranking the second message by assigning a third rank value.

10. The method of claim 9, wherein the first and third rank values are numeric scores.

11. The method of claim 10, further comprising disqualifying the second message by assigning the second rank value to the second message in automatically ranking the second message.

12. The method of claim 10, wherein a first explanation for providing the first message with the first rank value is included with the first message, and wherein a second explanation for providing the second message with the third rank value is included with the second message.

13. The method of claim 10, wherein the first and second messages identify potential defects in the computer program.

14. The method of claim 10, further comprising:
   inserting the first message into one of a plurality of bins based upon the first rank value; and
   inserting the second message into one of the plurality of bins based upon the third rank value.

15. The method of claim 6, further comprising displaying at least one of the plurality of messages on a graphical user interface (GUI).

16. The method of claim 15, wherein the GUI is a Web browser.

17. The method of claim 6, further comprising:
   determining whether a first message of the plurality of messages is to be disqualified after the first message has been received; and
   if so, disqualifying the first message;
   otherwise, automatically ranking the first message by assigning a first rank value to the first message.

18. The method of claim 17, further comprising:
   determining whether a second message of the plurality of defect messages is to be disqualified;
   if not, automatically ranking the second message by assigning a second rank value; and
   displaying the second message on the GUI.

19. The method of claim 18, further comprising:
   assigning the first message to a first group if the first rank value is above a predetermined threshold value;
   otherwise, assigning the first message to a second group if the first rank value is below the first predetermined threshold value.

20. The method of claim 18, further comprising:
   assigning the second message to the first group if the second rank value is above the predetermined threshold value;
   otherwise, assigning the second message to the second group.

21. The method of claim 20, further comprising assigning the first message to a third group if the first message has been disqualified.

22. The method of claim 21, further comprising assigning the second message to the third group if the second message has been disqualified.

23. The method of claim 22, further comprising withholding the second message from being displayed on the GUI if the second message has been assigned to the first or third groups.

24. The method of claim 21, further comprising withholding the first message from being displayed on the GUI if the first message has been assigned to the first or third groups.

25. An apparatus comprising:
   a ranking module for automatically ranking defect messages providing information about a computer program according to a set of criteria including whether a defect message includes an invalid pointer, the number of program lines included in the defect message, whether a defect message involves an inference and whether a defect message refers to multiple functions.

26. The apparatus of claim 25, further comprising a sort module coupled to the ranking module, wherein the sort module sorts the defect messages according to a rank value assigned at the ranking module.

27. The apparatus of claim 26, further comprising a disqualification module coupled to the ranking module for disqualifying at least one of the defect messages.

28. The apparatus of claim 27, wherein the defect messages are displayed on a graphical user interface (GUI) according to the rank value assigned at the ranking module.

29. The apparatus of claim 26, further comprising:
   a database for archiving the defect messages; and
   an initialization module coupled to the database for initializing the defect messages received at the database.

30. The apparatus of claim 28, wherein the defect messages disqualified at the disqualification module are not displayed on the GUI.

31. The apparatus of claim 26, wherein the defect messages are grouped into one of a plurality of bins according to the rank value assigned at the ranking module.

32. The apparatus of claim 20, wherein an explanation is provided for the rank value of each defect message ranked at the ranking module.

* * * * *

UNITED STATES PATENT AND TRADEMARK OFFICE
CERTIFICATE OF CORRECTION

PATENT NO. : 6,782,530 B1
DATED : August 24, 2004
INVENTOR(S) : Jonathan D. Pincus It is certified that error appears in the above-identified patent and that said Letters Patent is hereby corrected as shown below:

Column 10,
Line 1, delete "claim 20" and insert -- claim 26 -- therefore.

Signed and Sealed this

Seventeenth Day of May, 2005

JON W. DUDAS
*Director of the United States Patent and Trademark Office*